(12) United States Patent
Desai et al.

(10) Patent No.: US 7,548,392 B1
(45) Date of Patent: Jun. 16, 2009

(54) DISK DRIVE CONTROLLING A VOICE COIL MOTOR DURING AN EMERGENCY UNLOAD

(75) Inventors: Ashok K. Desai, Westlake Village, CA (US); Robert P. Ryan, Mission Viejo, CA (US); Hemant Melkote, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/804,819

(22) Filed: May 21, 2007

(51) Int. Cl.
*G11B 21/02* (2006.01)
(52) U.S. Cl. ........................................................ 360/75
(58) Field of Classification Search ........................ None
See application file for complete search history.

(56) References Cited

U.S. PATENT DOCUMENTS

| | | | |
|---|---|---|---|
| 5,768,045 A | 6/1998 | Patton, III et al. | |
| 5,969,899 A | 10/1999 | Utenick et al. | |
| 6,081,400 A * | 6/2000 | Lu et al. | 360/75 |
| 6,188,192 B1 | 2/2001 | Chen | |
| 6,316,898 B1 | 11/2001 | Albrecht et al. | |
| 6,392,375 B1 * | 5/2002 | Portaluri et al. | 318/459 |
| 6,396,652 B1 | 5/2002 | Kawachi et al. | |
| 6,512,650 B1 | 1/2003 | Tanner | |
| 6,549,359 B1 | 4/2003 | Bennett et al. | |
| 6,549,361 B1 | 4/2003 | Bennett et al. | |
| 6,566,832 B2 | 5/2003 | Ataee | |
| 6,577,465 B1 * | 6/2003 | Bennett et al. | 360/69 |
| 6,700,344 B1 | 3/2004 | Krishnamoorthy et al. | |
| 6,859,340 B2 | 2/2005 | Brittner et al. | |
| 6,934,135 B1 | 8/2005 | Ryan | |
| 6,937,429 B2 | 8/2005 | Yoshida et al. | |
| 6,967,458 B1 | 11/2005 | Bennett et al. | |
| 6,970,319 B1 * | 11/2005 | Bennett et al. | 360/75 |
| 6,972,921 B1 | 12/2005 | Rana et al. | |
| 7,068,460 B2 | 6/2006 | Brenden et al. | |
| 7,116,512 B1 | 10/2006 | Rana et al. | |
| 2005/0264914 A1 | 12/2005 | Kusumoto | |

\* cited by examiner

*Primary Examiner*—K. Wong
(74) *Attorney, Agent, or Firm*—Howard H. Sheerin, Esq.

(57) ABSTRACT

A disk drive is disclosed including a disk, a spindle motor operable to rotate the disk, a head, and a voice coil motor (VCM) operable to actuate the head over the disk, wherein the VCM comprises a voice coil. The disk drive further comprises a capacitor, and a back electromotive force (BEMF) voltage generator operable to generate a BEMF voltage from the spindle motor. The disk drive further comprises switching circuitry operable to connect the voice coil to the capacitor while accelerating the VCM, and to disconnect the voice coil from the capacitor and connect the voice coil to the BEMF voltage while decelerating the VCM.

21 Claims, 4 Drawing Sheets

DISK DRIVE CONTROLLING A VOICE COIL MOTOR DURING AN EMERGENCY UNLOAD

BACKGROUND

1. Field

The present invention relates to disk drives for computer systems. In particular, the present invention relates to a disk drive controlling a voice coil motor during an emergency unload.

2. Description of the Related Art

A disk drive typically comprises a disk rotated by a spindle motor and a head actuated over the disk by a voice coil motor (VCM) in order to write/read data to/from the disk surface. When the spindle motor spins down the disk, for example, just prior to the disk drive being powered down or entering an idle mode, the head may be unloaded off the disk onto a ramp that extends over an outer diameter of the disk. When the disk drive is powered on or exits the idle mode, the spindle motor spins up the disk and the head is loaded off the ramp onto the disk.

During normal unload operations, an external supply voltage (e.g., from a host) provides sufficient power to enable the VCM to successfully park the head on the ramp. However, if a power failure occurs while the head is over the disk, the external supply voltage is lost, thereby requiring some other source of power to unload the head. Prior art disk drives have typically used the back electromotive force (BEMF) of the spindle motor to power the VCM during an emergency unload. A power capacitor has also been employed as a crude battery to augment the BEMF voltage, particularly in small form factor disk drives where the momentum of the disk and spindle motor may not provide sufficient energy alone to unload the head. Larger power capacitors provide more energy for unloading the head, but increase the expense of the disk drive.

There is, therefore, a need to improve the emergency unload operation of a disk drive.

SUMMARY OF THE EMBODIMENTS OF THE INVENTION

An embodiment of the present invention comprises a disk drive including a disk, a spindle motor operable to rotate the disk, a head, and a voice coil motor (VCM) operable to actuate the head over the disk, wherein the VCM comprises a voice coil. The disk drive further comprises a capacitor, and a back electromotive force (BEMF) voltage generator operable to generate a BEMF voltage from the spindle motor. The disk drive further comprises switching circuitry operable to connect the voice coil to the capacitor while accelerating the VCM, and to disconnect the voice coil from the capacitor and connect the voice coil to the BEMF voltage while decelerating the VCM.

In one embodiment, the BEMF voltage is not connected to the voice coil while accelerating the VCM, and in another embodiment, the switching circuitry connects the voice coil to the capacitor and the BEMF voltage while accelerating the VCM.

In yet another embodiment, a boost circuit boosts the BEMF voltage to generate a boosted BEMF voltage, wherein the boosted BEMF voltage charges the capacitor.

In still another embodiment, the disk drive further comprises a velocity detector operable to detect a velocity of the VCM, wherein the VCM is accelerated when the velocity falls below a first threshold and the VCM is decelerated when the velocity rises above a second threshold. In one embodiment, the first threshold substantially equals the second threshold, and in another embodiment, the first threshold is substantially different from the second threshold.

In another embodiment, the disk drive further comprises a PWM signal generator operable to generate a PWM signal coupled to the switching circuitry, a current detector operable to detect a current flowing through the voice coil, and a comparator operable to adjust the PWM signal when the detected current rises above an upper-limit threshold and to adjust the PWM signal when the detected current falls below a lower-limit threshold. In one embodiment, the lower-limit threshold is programmable.

Another embodiment of the present invention comprises a method of operating a disk drive, the disk drive comprising a disk, a spindle motor operable to rotate the disk, a head, and a voice coil motor (VCM) operable to actuate the head over the disk, wherein the VCM comprising a voice coil. The disk drive further comprises a capacitor, and a back electromotive force (BEMF) voltage generator operable to generate a BEMF voltage from the spindle motor. The method comprises connecting the voice coil to the capacitor while accelerating the VCM, and disconnecting the voice coil from the capacitor and connecting the voice coil to the BEMF voltage while decelerating the VCM.

DETAILED DESCRIPTION OF EMBODIMENTS OF THE INVENTION

Figure 1:
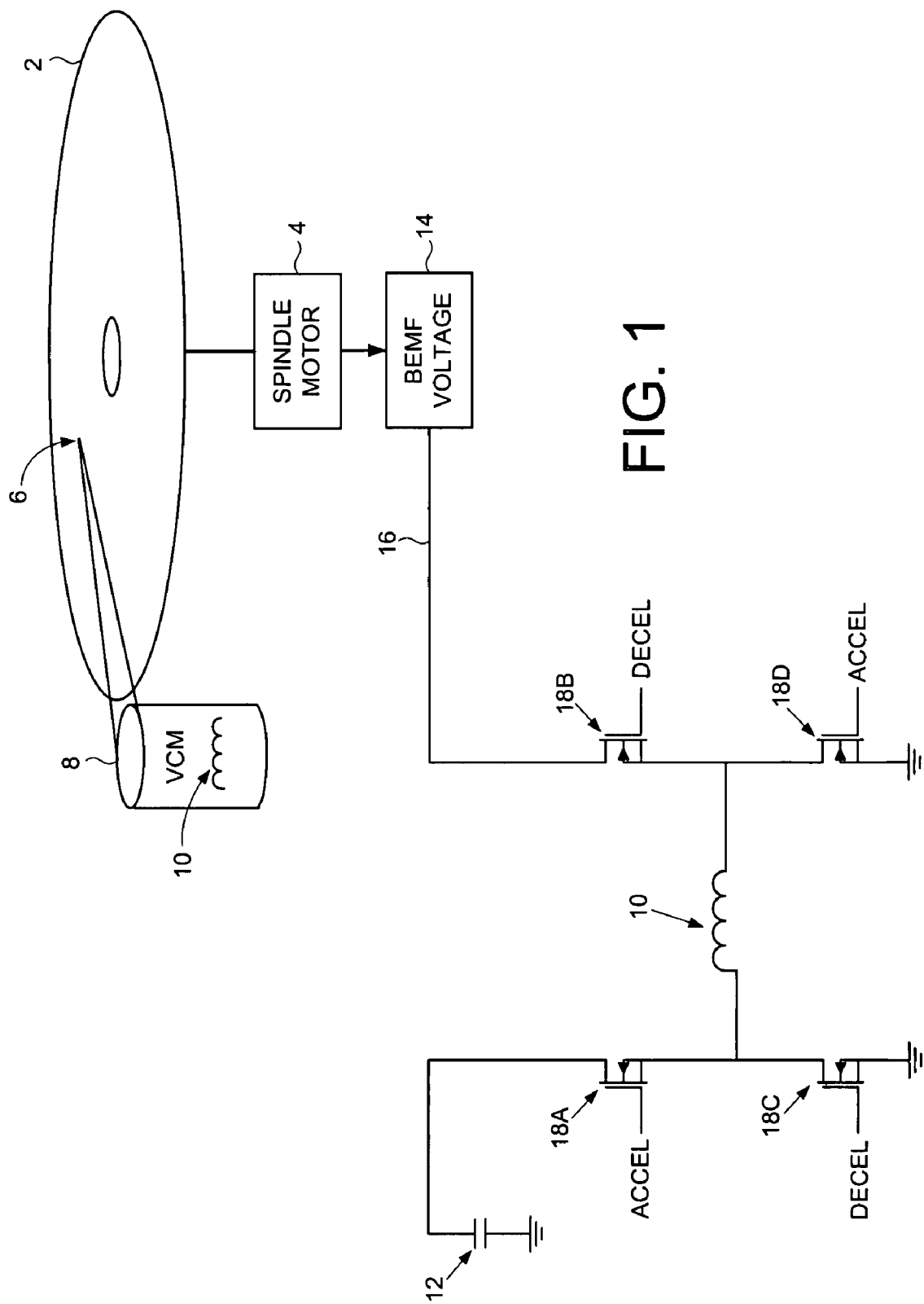
FIG. 1 shows a disk drive according to an embodiment of the present invention comprising a capacitor operable to power a VCM during an emergency unload, wherein the capacitor is disconnected from the VCM while decelerating the VCM.

FIG. 1 shows a disk drive according to an embodiment of the present invention including a disk 2, a spindle motor 4 operable to rotate the disk 2, a head 6, and a voice coil motor (VCM) 8 operable to actuate the head 6 over the disk 2, wherein the VCM 8 comprises a voice coil 10. The disk drive further comprises a capacitor 12, and a back electromotive force (BEMF) voltage generator 14 operable to generate a BEMF voltage 16 from the spindle motor 4. The disk drive further comprises switching circuitry 18A-18D operable to connect the voice coil 10 to the capacitor 12 while accelerating the VCM 8, and to disconnect the voice coil 10 from the capacitor 12 and connect the voice coil 10 to the BEMF voltage 16 while decelerating the VCM 8.

In one embodiment, the capacitor 12 powers the VCM 8 during an emergency unload operation in order to unload the head 6 off the disk 2 onto a ramp (not shown) at the outer periphery of the disk 2. For example, in one embodiment the unload operation is performed when an external power supply from a host is lost due to a power failure. The capacitor 12 acts as a crude battery to help accelerate the VCM 10 toward the ramp.

In the embodiment of FIG. 1, the switching circuitry 18A-18D comprises an H-bridge circuit for driving the VCM 8. The switching circuitry 18A-18D is configured to drive current through the voice coil 10 in order to rotate the VCM in a corresponding direction. During an emergency unload, the VCM 8 is rotated in a direction that causes the head 6 to accelerate toward and then up the ramp. In the example shown in FIG. 1, to accelerate the head 6 toward the ramp, switches 18A and 18D are turned on in order to source current from capacitor 12 through the voice coil 10 to ground (switches 18B and 18C are turned off). To decelerate the head 6, switches 18A and 18D are turned off in order to disconnect the capacitor 12 from the voice coil 10, and switches 18B and 18C are turned on in order to source current from the BEMF voltage 16 through the voice coil 10 to ground. This expeditious use of current from the capacitor 12 to accelerate the VCM 8 while disconnecting the capacitor 12 to decelerate the VCM 8 reduces the required size of the capacitor 12, thereby reducing the cost of the disk drive.

Prior to the emergency unload operation, the capacitor 12 is charged in any suitable manner, such as by using an external power supply voltage. In one embodiment, the external power supply voltage is boosted using a suitable boost circuit, and the boosted voltage used to charge the capacitor 12. In this manner, more energy may be stored by the capacitor for use during the emergency unload operation.

Figure 2:
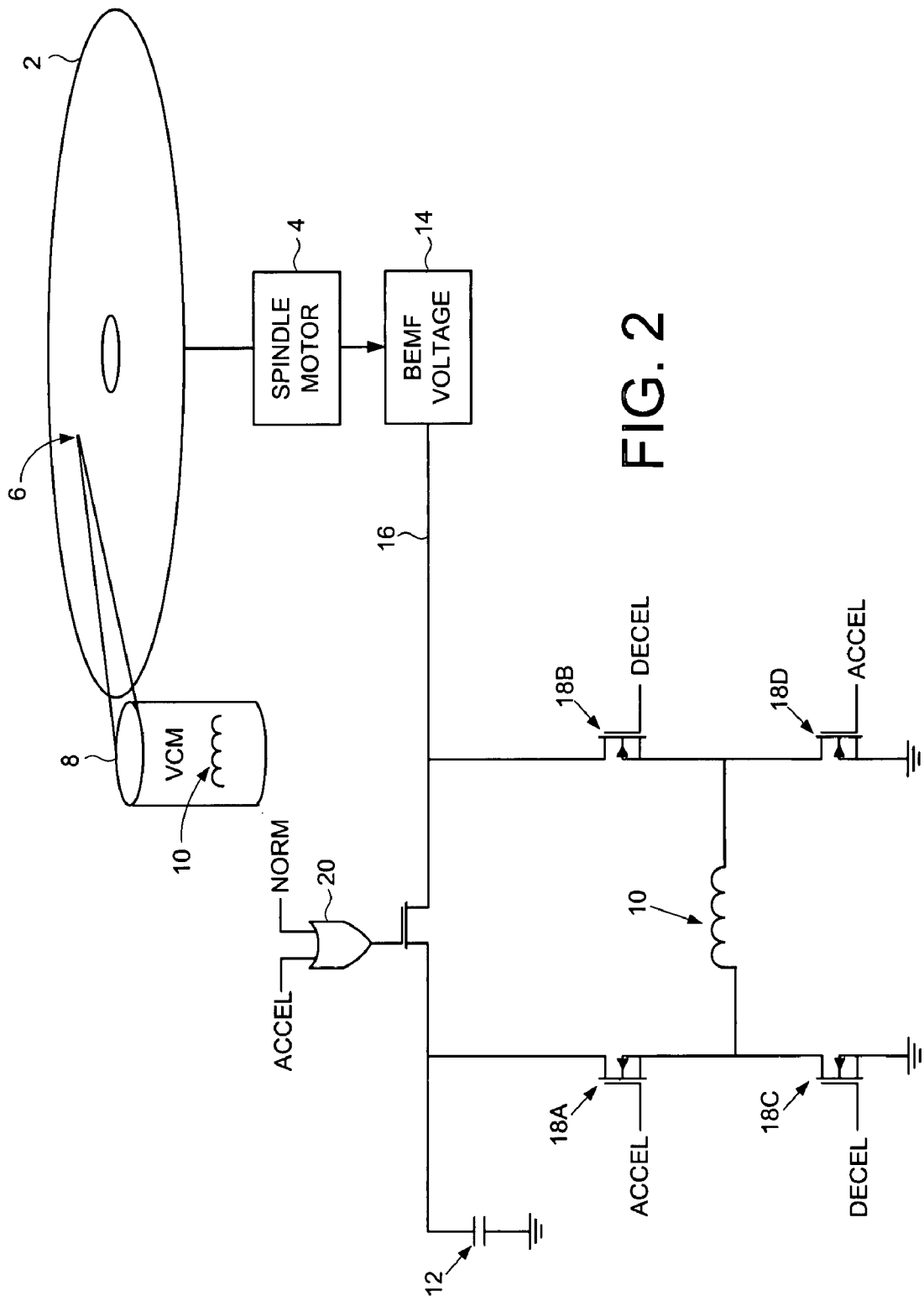
FIG. 2 shows a disk drive according to an embodiment of the present invention wherein a back electromotive force (BEMF) voltage from a spindle motor is connected to the VCM while accelerating the VCM.

In an embodiment shown in FIG. 2, the capacitor 12 is charged using the BEMF voltage 16 generated from the spindle motor 4 during normal operation as well as during the emergency unload (using OR gate 20). Accordingly, in this embodiment the switching circuitry 18A-18D connects the voice coil 10 to the capacitor 12 and the BEMF voltage 16 while accelerating the VCM 8, and connects only BEMF voltage 16 to the voice coil 10 while decelerating the VCM 8 during the emergency unload operation.

Figure 3:
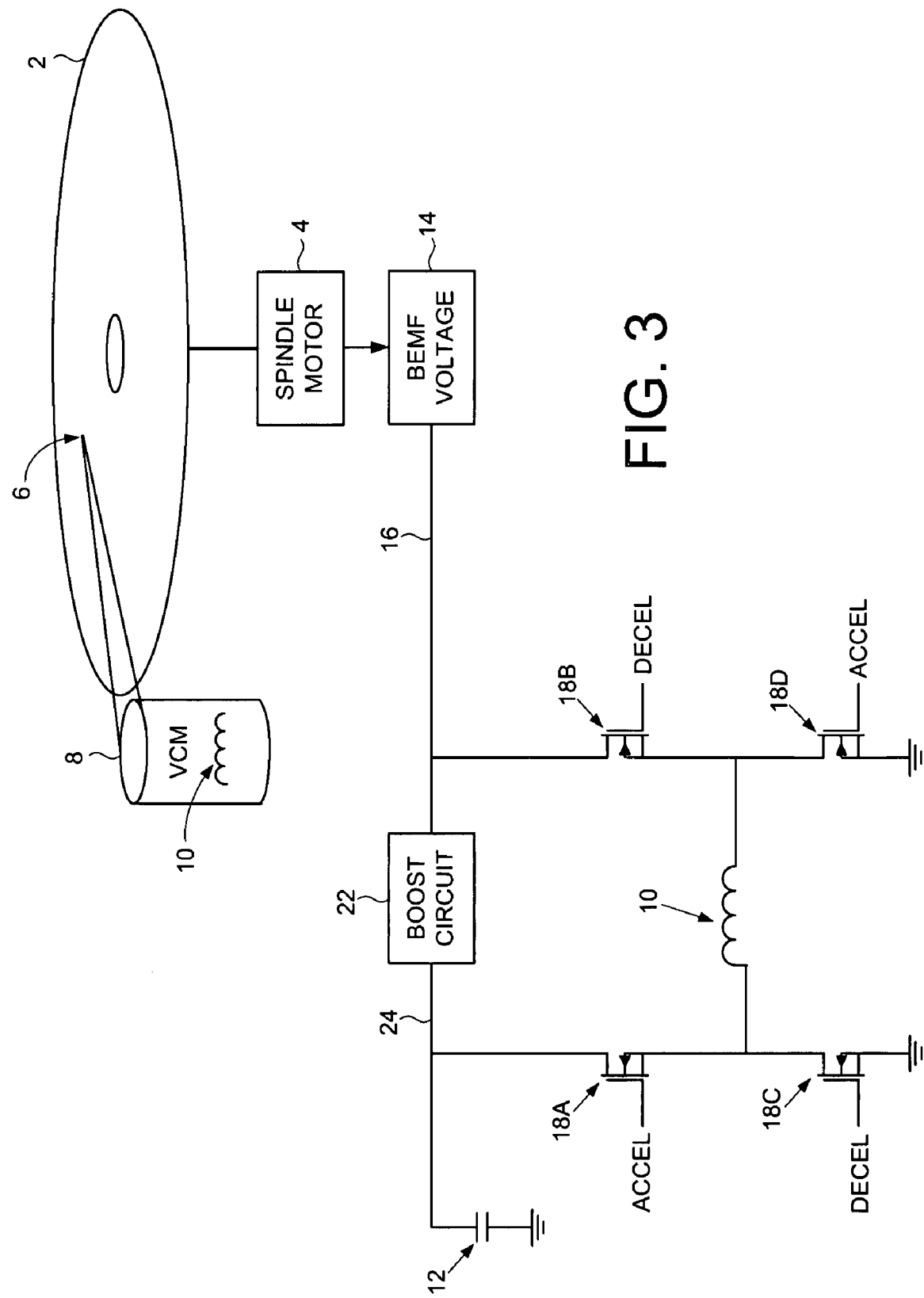
FIG. 3 shows a disk drive comprising a boost circuit operable to boost the BEMF voltage, wherein the boosted BEMF voltage charges the capacitor.

FIG. 3 shows an embodiment of the present invention wherein the disk drive further comprises a boost circuit 22 operable to boost the BEMF voltage 16, wherein the boosted BEMF voltage 24 charges the capacitor 12. Any suitable BEMF voltage generator 14 and boost circuit 22 may be employed in the embodiments of the present invention. In one embodiment, the BEMF voltage generator 14 and boost circuit 22 are implemented using suitable upper and lower switching circuitry for commutating the spindle motor 4, wherein the upper switching circuitry are turned off and the lower switching circuitry are periodically turned on to short the windings and thereby boost the current flowing through the windings of the spindle motor 4. More details of this embodiment are disclosed in U.S. Pat. No. 6,549,361 entitled "DISK DRIVE COMPRISING SPIN DOWN CIRCUITRY HAVING A POWER CLAMP CIRCUIT FOR ENHANCING POWER AND BRAKING CONTROL" the disclosure of which is incorporated herein by reference. In an alternative embodiment, the BEMF voltage generator 14 may be implemented using synchronous rectification which improves efficiency by avoiding the voltage drop across the flyback diodes of the commutation switching circuitry, wherein in this embodiment the boost circuit 22 may comprise any suitable voltage boosting circuitry.

Figure 4:
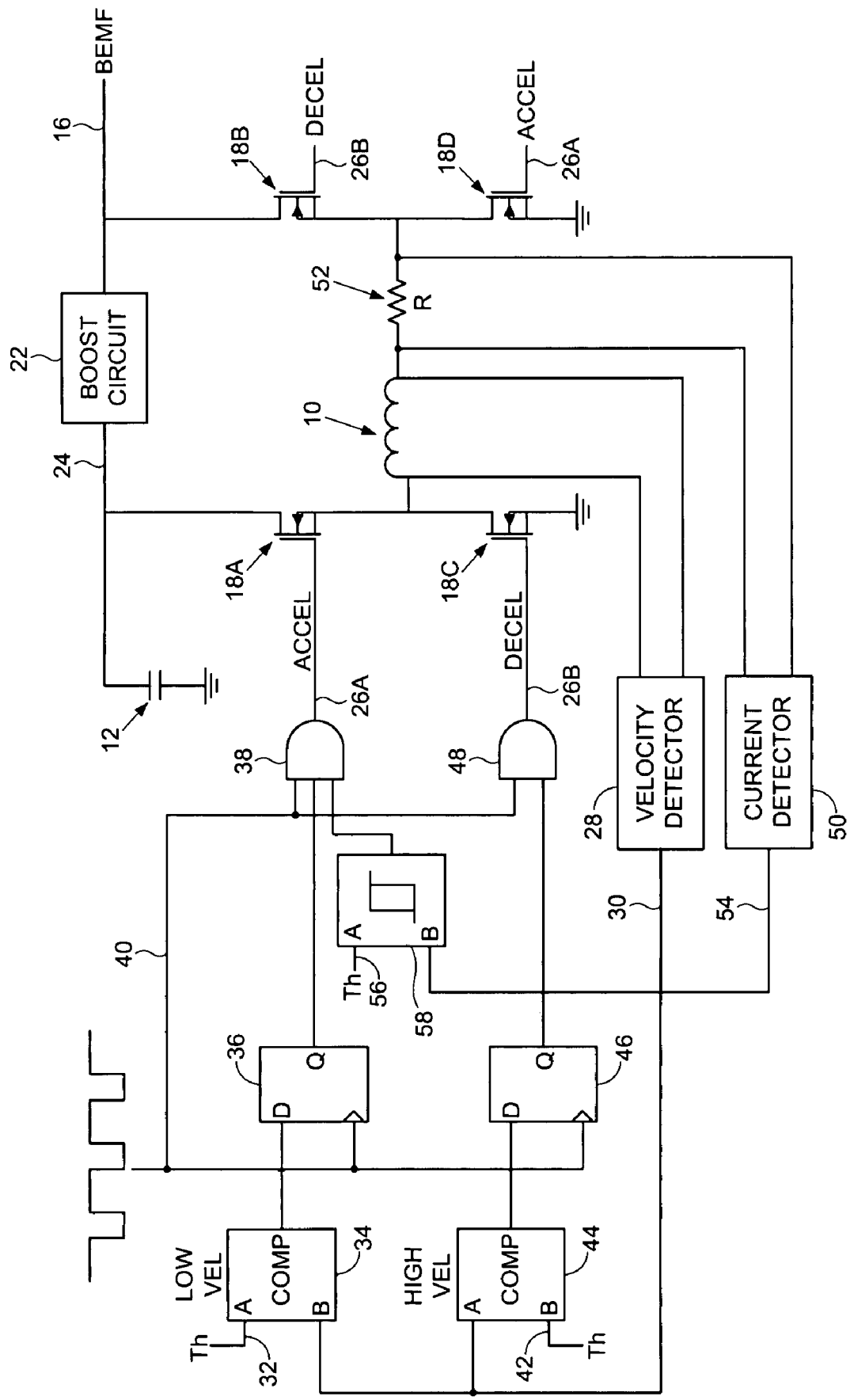
FIG. 4 shows circuitry according to an embodiment of the present invention including a velocity detector for accelerating/decelerating the VCM when outside a velocity range, and a current detector for adjusting a PWM driving signal.

FIG. 4 shows circuitry according to another embodiment of the present invention wherein the switching circuitry 18A-18D for driving the voice coil 10 is pulse width modulated (PWM) by a PWM signal 26A and 26B in order to further improve power efficiency. In addition, the PWM signal 26A is disabled if the velocity of the VCM 8 is within a predetermined range in order to conserve the energy in the capacitor 12 when it is not needed. Still further, in this embodiment the duty cycle of PWM signal 26A is adjusted when the current flowing through the voice coil 10 exceeds a predetermined threshold in order to limit the maximum acceleration applied to the VCM 8 which may help protect against damaging the head 6.

The circuitry of FIG. 4 comprises a velocity detector 28 operable to detect an estimated velocity 30 of the VCM 8 by evaluating the voltage across the voice coil 10 which comprises a component due to the resistance of the voice coil 10, a component due to the inductance of the voice coil 10, and a component due to the velocity of the voice coil 10 (BEMF voltage). In one embodiment, the velocity detector 28 comprises suitable circuitry for compensating for the resistance and inductance voltage of the voice coil to provide a more accurate estimate of the velocity 30 (BEMF voltage). In an alternative embodiment, the resistance and inductance voltage are not compensated since the corresponding error may not be of significant concern.

The estimated velocity 30 is compared to a first threshold 32 at comparator 34, wherein if the estimated velocity 30 falls below the first threshold 32, the comparator 34 enables register 36 which in turn enables AND gate 38 so that an oscillation signal 40 generates the PWM signal 26A applied to switching circuits 18A and 18D thereby accelerating the head 6 toward the park position. The estimated velocity 30 is also compared to a second threshold 42 at comparator 44, wherein if the estimated velocity 30 rises above the second threshold 42, the comparator 44 enables register 46 which in turn enables AND gate 48 so that the oscillation signal 40 generates the PWM signal 26B applied to switching circuits 18B and 18C in order to decelerate the head 6. While the estimated velocity 30 is between the first and second thresholds 32 and 42, the PWM signals 26A and 26B are disabled by the AND gates 38 and 48, thereby conserving the energy stored in the capacitor 12.

In one embodiment, the first and second thresholds 32 and 42 may be substantially equal or even the same value to provide tight control over the velocity of the VCM 8. In an alternative embodiment, the first and second thresholds 32 and 42 are substantially different which may improve power efficiency.

In the embodiment of FIG. 4, the circuitry further comprises a current detector 50 operable to detect a current flowing through a sense resistor 52 in series with the voice coil 10. The detected voice coil current 54 is compared to a threshold 56 at comparator 58, wherein if the detected current 54 rises above the threshold 56, the comparator 58 adjusts the PWM signal 26A (through AND gate 38) by truncating the duty cycle of the current PWM cycle. In this manner, the amount of force (acceleration) applied to the VCM is limited which helps protect against damaging the head 6. Limiting the voice coil current may also protect against damaging the switching circuitry 18A-18D.

In one embodiment, the comparator 58 comprises a hysteretic comparator wherein the output remains low to maintain the output of AND gate 38 in a low state until a predetermined condition is satisfied. In one embodiment, the output of comparator 58 remains low until the beginning of the next PWM cycle.

In another embodiment, the threshold 56 includes a lower-limit threshold and a higher-limit threshold. In this embodiment, the output of comparator 58 remains high until the detected current 54 exceeds the higher-limit threshold. The output of comparator 58 then remains low until the detected current 54 falls below the lower-limit threshold. In this embodiment, the output of AND gate 38 may cycle between a high and low state within a single PWM cycle, which may truncate the duty cycle by dividing the on-time of the PWM cycle into a plurality of on-times. In one embodiment, one or both of the upper-limit and lower-limit thresholds may be programmable.

In one embodiment, a frequency of the oscillation signal 40 is also programmable, and in one embodiment, the frequency of the oscillation signal 40 is programmed to a value that helps minimize acoustic noise generated by the VCM 8. In the embodiment of FIG. 4, the detected current 54 adjusts a duty cycle of the PWM signal 26A by adjusting the on-time and the off-time. In an alternative embodiment, the PWM signal 26A comprises a fixed off-time and the detected current 54 adjusts only the on-time.

Any suitable circuitry may be employed in the embodiments of the present invention. For example, in one embodiment the logic circuits of FIG. 4 may be replaced with an analog-to-digital converter (ADC) for sampling the voice coil voltage and current, and a microprocessor for executing steps of a control program. In other embodiments, the switching circuitry 18A-18D may be driven in a linear mode rather than pulse width modulated as shown in FIG. 4.

What is claimed is:

1. A disk drive comprising:
   a disk;
   a spindle motor operable to rotate the disk;
   a head;
   a voice coil motor (VCM) operable to actuate the head over the disk, the VCM comprising a voice coil;
   a capacitor;
   a back electromotive force (BEMF) voltage generator operable to generate a BEMF voltage from the spindle motor; and
   switching circuitry operable to connect the voice coil to the capacitor while accelerating the VCM, and to disconnect the voice coil from the capacitor and connect the voice coil to the BEMF voltage while decelerating the VCM.

2. The disk drive as recited in claim 1, wherein the BEMF voltage is not connected to the voice coil while accelerating the VCM.

3. The disk drive as recited in claim 1, wherein the switching circuitry connects the voice coil to the capacitor and the BEMF voltage while accelerating the VCM.

4. The disk drive as recited in claim 1, further comprising a boost circuit operable to boost the BEMF voltage to generate a boosted BEMF voltage, wherein the boosted BEMF voltage charges the capacitor.

5. The disk drive as recited in claim 1, further comprising a velocity detector operable to detect a velocity of the VCM, wherein the VCM is accelerated when the velocity falls below a first threshold and the VCM is decelerated when the velocity rises above a second threshold.

6. The disk drive as recited in claim 5, wherein the first threshold substantially equals the second threshold.

7. The disk drive as recited in claim 5, wherein the first threshold is substantially different from the second threshold.

8. The disk drive as recited in claim 1, further comprising:
   a pulse width modulated (PWM) signal generator operable to generate a PWM signal coupled to the switching circuitry;
   a current detector operable to detect a current flowing through the voice coil; and
   a comparator operable to adjust the PWM signal when the detected current rises above an upper-limit threshold and to adjust the PWM signal when the detected current falls below a lower-limit threshold.

9. The disk drive as recited in claim 8, wherein the lower-limit threshold is programmable.

10. A method of operating a disk drive, the disk drive comprising a disk, a spindle motor operable to rotate the disk, a head, a voice coil motor (VCM) operable to actuate the head over the disk, the VCM comprising a voice coil, a capacitor, a back electromotive force (BEMF) voltage generator operable to generate a BEMF voltage from the spindle motor, the method comprising:
    connecting the voice coil to the capacitor while accelerating the VCM; and
    disconnecting the voice coil from the capacitor and connecting the voice coil to the BEMF voltage while decelerating the VCM.

11. The method as recited in claim 10, wherein the BEMF voltage is not connected to the voice coil while accelerating the VCM.

12. The method as recited in claim 10, further comprising connecting the voice coil to the capacitor and the BEMF voltage while accelerating the VCM.

13. The method as recited in claim 10, further comprising boosting the BEMF voltage to generate a boosted BEMF voltage, and charging the capacitor with the boosted BEMF voltage.

14. The method as recited in claim 10, further comprising detecting a velocity of the VCM, wherein the VCM is accelerated when the velocity falls below a first threshold and the VCM is decelerated when the velocity rises above a second threshold.

15. The method as recited in claim 14, wherein the first threshold substantially equals the second threshold.

16. The method as recited in claim 14, wherein the first threshold is substantially different from the second threshold.

17. The method as recited in claim 10, further comprising:
    generating a pulse width modulated (PWM) signal operable to connect the voice coil to the capacitor while accelerating the VCM;
    detecting a current flowing through the voice coil; and
    adjusting the PWM signal when the detected current rises above an upper-limit threshold and adjusting the PWM signal when the detected current falls below a lower-limit threshold.

18. The method as recited in claim 17, wherein the lower-limit threshold is programmable.

19. A disk drive comprising:
    a disk;
    a spindle motor operable to rotate the disk;
    a head;
    a voice coil motor (VCM) operable to actuate the head over the disk, the VCM comprising a voice coil;
    a capacitor;
    a means for generating a back electromotive force (BEMF) voltage from the spindle motor; and
    a means for connecting the voice coil to the capacitor while accelerating the VCM, and for disconnecting the voice coil from the capacitor and connecting the voice coil to the BEMF voltage while decelerating the VCM.

20. The disk drive as recited in claim 19, wherein the means for connecting the voice coil to the capacitor while accelerating the VCM, and for disconnecting the voice coil from the capacitor and connecting the voice coil to the BEMF voltage while decelerating the VCM comprises a means for generating a pulse width modulated (PWM) signal.

21. The disk drive as recited in claim 20, further comprising:
    a means for detecting a velocity of the VCM;
    a means for detecting a current flowing through the voice coil; and
    a means for adjusting the PWM signal in response to the velocity and the current.

\* \* \* \* \*